United States Patent [19]

DeMario

[11] Patent Number: 4,895,698
[45] Date of Patent: Jan. 23, 1990

[54] NUCLEAR FUEL ROD GRIP WITH MODIFIED DIAGONAL SPRING STRUCTURES

[75] Inventor: Edmund E. DeMario, Columbia, S.C.

[73] Assignee: Westinghouse Electric Corp., Pittsburgh, Pa.

[21] Appl. No.: 168,060

[22] Filed: Mar. 14, 1988

[51] Int. Cl.⁴ ............................................. G21C 3/34
[52] U.S. Cl. ..................................... 376/442; 376/438
[58] Field of Search ............................... 376/442, 438

[56] References Cited

U.S. PATENT DOCUMENTS

| | | | |
|---|---|---|---|
| 3,070,534 | 12/1962 | Kooistra | 204/193.2 |
| 3,646,994 | 3/1972 | Piepers et al. | 165/69 |
| 3,679,547 | 7/1972 | Warberg | 176/78 |
| 3,795,040 | 3/1974 | Jabsen | 29/433 |
| 3,928,131 | 12/1975 | Wachter et al. | 176/78 |
| 3,933,584 | 1/1976 | Litt | 176/78 |
| 4,061,536 | 12/1977 | Creagan et al. | 176/78 |
| 4,090,918 | 5/1978 | Masetti | 176/78 |
| 4,492,844 | 1/1985 | Kobuck et al. | 219/121 |
| 4,585,616 | 4/1986 | DeMario et al. | 376/442 |
| 4,702,881 | 10/1987 | Weiland et al. | 376/442 |
| 4,803,043 | 2/1989 | DeMario et al. | 376/442 |

FOREIGN PATENT DOCUMENTS 1961035 6/1971 Fed. Rep. of Germany.
1497083 10/1965 France.
61-90085 5/1986 Japan.

Primary Examiner—Donald P. Walsh

[57] ABSTRACT

A nuclear fuel assembly grid includes a multiplicity of spring structures for engaging fuel rods extending through the cells of the grid. Each spring structure is formed on each cell wall section to form a matrix of fuel rod receiving cells in the grid. Each spring structure is composed of a pair of spaced apart upper and lower opposite outer portions being integrally attached at their outer ends to the respective wall section, and a middle portion disposed between and integrally connected at its outer ends with respective inner ends of the upper and lower outer portions. The upper and lower outer portions extend in alignment with one another and in generally diagonal relation to the direction of the central longitudinal axis of the one cell between upper and lower portions of the wall section. The middle portion which contacts the fuel rod extends in generally transverse relation to the direction of the central longitudinal axis of the one cell.

15 Claims, 7 Drawing Sheets

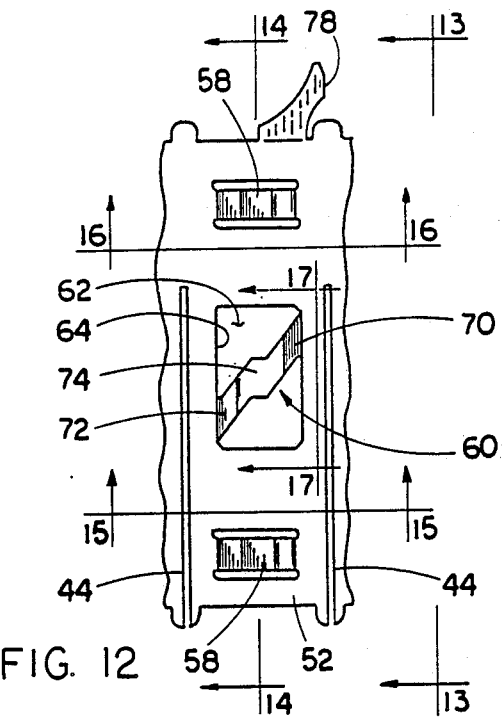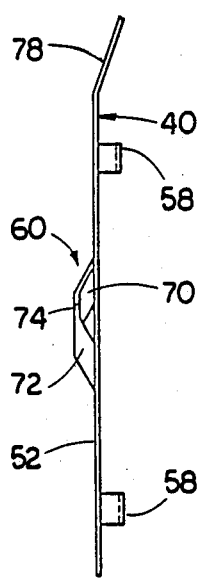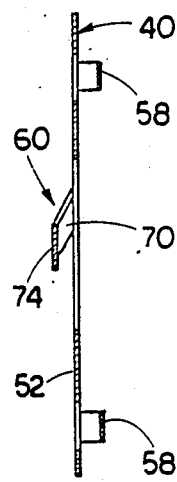
FIG. 12  FIG. 13  FIG. 14
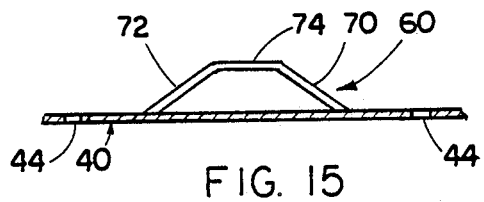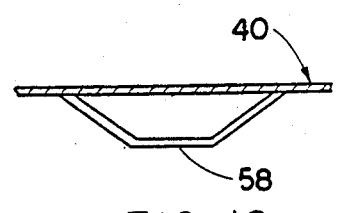
FIG. 15  FIG. 16
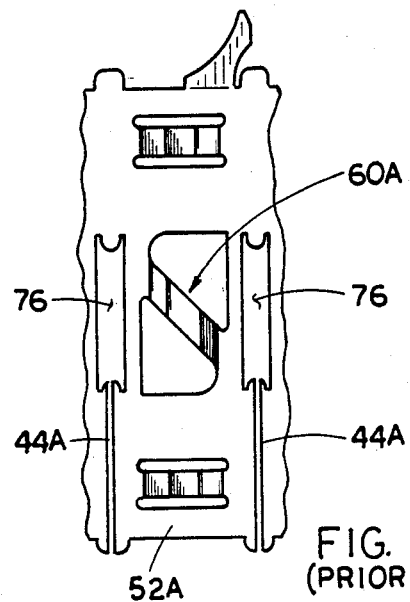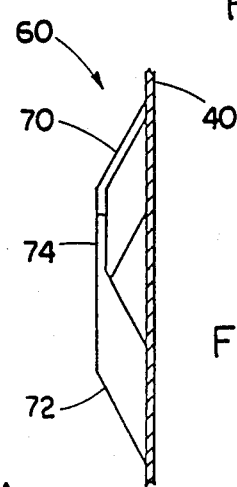
FIG. 12A (PRIOR ART)  FIG. 17

NUCLEAR FUEL ROD GRIP WITH MODIFIED DIAGONAL SPRING STRUCTURES

CROSS REFERENCE TO RELATED APPLICATIONS

Reference is hereby made to the following applications dealing with related subject matter and assigned to the assignee of the present invention:
1. "Nuclear Fuel Spacer Grid With Improved Grid Straps" by Edmund E. DeMario, assigned U.S. Ser. No. 473,516 and filed Mar. 9, 1983. (W.E. 50,973)
2. "Partial Grid For A Nuclear Reactor Fuel Assembly" by Edmund E. DeMario, assigned U.S. Ser. No. 564,049 and filed Dec. 21, 1983. (W.E. 51,313)
3. "A Low Pressure Drop Grid For A Nuclear Reactor Fuel Assembly" by Edmund E. DeMario et al, assigned U.S. Ser. No. 567,448 and filed Dec. 30, 1983. (W.E. 51,417)
4. "A Coolant Flow Mixer Grid For A Nuclear Reactor Fuel Assembly" by Edmund E. DeMario et al, assigned U.S. Ser. No. 567,450 and filed Dec. 30, 1983. (W.E. 50,974)
5. "Nuclear Fuel Rod Support Grid With Improved Multiple Dimple Arrangement" by John A. Rylatt, assigned U.S. Ser. No. 729,387 and filed May 1, 1985. (W.E. 52,505)
6. "Nuclear Fuel Rod Grid Spring And Dimple Structures" by Edmund E. DeMario et al, assigned U.S. Ser. No. 125,514 and filed Nov. 25, 1987, a continuation-in-part of copending U.S. Ser. No. 053,990, filed May 22, 1987, now abandoned.

BACKGROUND OF THE INVENTION

1. Field of the Invention

The present invention relates generally to nuclear fuel assemblies and, more particularly, is concerned with a nuclear fuel rod grid having modified diagonal fuel rod engaging spring structures.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles which extend slightly above and below the ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Representative grid designs include those of some of the patent applications cross-referenced above.

One popular conventional grid design, being illustrated and described in Kobuck et al U.S. Pat. No. 4,492,844 to and assigned to the assignee of the present invention, includes a multiplicity of interleaved inner and outer straps having an egg-crate configuration forming a multiplicity of cells which individually accept the fuel rods and control rod guide thimbles. The cells of each grid which accept and support the fuel rods at a given axial location therealong typically use relatively resilient springs and/or relatively rigid protrusions (called dimples) formed into the metal of the interleaved straps. The springs and dimples of each grid cell frictionally engage or contact the respective fuel rod extending through the cell. Additionally, the outer straps are attached together and peripherally enclose the inner straps to impart strength and rigidity to the grid.

However, several drawbacks arise from this particular grid design. The vertical orientation and configuration of the fuel rod engaging springs require that the springs and thus the grid be of substantial height in order for the springs to have the desired amount of resiliency to function properly. This requirement increases the amount of parasitic structural material utilized in the fuel assembly and the pressure drop through the fuel assembly.

Representative of other prior art grid designs are the ones described and illustrated in Kooistra U.S. Pat. No. 3,070,534, Piepers et al U.S. Pat. No. 3,646,994, Wachter et al U.S. Pat. No. 3,928,131, Litt U.S. Pat. No. 3,933,584, Creagan et al U.S. Pat. No. 4,061,536, DeMario et al U.S. Pat. No. 4,585,616 and Weiland et al U.S. Pat. No. 4,702,881; French patent No. 1,497,083; West German patent No. 1,961,035; and Japanese patent No. 61-90085. While all of these grids may function satisfactory and generally achieve the objectives for which they were designed, none would appear to suggest an approach which will satisfactorily overcome the aforementioned drawbacks of the one conventional grid design briefly described above. Consequently, a need still exists for an improved grid spring structure which will avoid the above drawbacks without presenting new ones in their place.

SUMMARY OF THE INVENTION

The present invention provides a fuel rod grid designed to satisfy the aforementioned needs. The grid of the present invention includes inner grid straps containing unique fuel rod engaging spring structures on the wall sections of the straps which define a matrix of fuel rod receiving grid cells. Each spring structure is integrally composed of a pair of upper and lower opposite outer portions and a middle portion therebetween. Overall, the spring structure extends diagonally between and is integrally attached at such respective outer portions to upper and lower portions of a respective wall section.

The spring structure preferably is set approximately forty-five degrees to the direction of the longitudinal axis of the grid cell and fuel assembly in which the grid is used. Yet the spring structure is open with respect to the direction of coolant flow. Forty-five degrees appears to be the optimum angle so that grid height can be reduced and spring profile exposed to coolant flow can be minimized.

It has been discovered that with the use of diagonal spring structures the overall strength of the grid is increased. Thus, welds at the intersections between the straps are no longer necessary. This results in a considerable cost savings in the manufacture of the grid. Also, with elimination of the welds, the weld openings or cavities in the grid straps adjacent the spring structures, which were necessary heretofore to form the welds, can likewise be eliminated. However, with elimination of the weld cavities, less material is removed from the grid walls sections adjacent to the spring structures to form the slits by which the straps intermesh. The presence of more material undesirably increases the stiffness of the diagonal spring structure.

It has been discovered that by forming the spring structure in a modified diagonal shape the stiffness of the spring structure can be reduced. In the modified diagonal shape of the spring structure, its middle portion which contacts the fuel rod is formed to extend generally horizontally as opposed to diagonally and thus has edges which extend substantially transverse or perpendicular to the fuel rod. In addition to reducing spring stiffness, the horizontally-extending middle portion has been found to decrease scratching of the fuel rod which occurs when the fuel rod is pulled through the grid cell if the total spring structure extends completely diagonal with respect to the fuel rod.

Accordingly, the present invention is directed to a plurality of fuel rod engaging spring structures in a nuclear fuel rod grid. The grid includes a plurality of inner and outer straps being interleaved with one another to form a matrix of hollow cells, each cell for receiving one fuel rod and being defined by pairs of opposing wall sections of the straps which wall sections are shared with adjacent cells. Each cell has a central longitudinal axis. Each fuel rod engaging spring structure formed on each wall section of the inner straps, includes: (a) a pair of spaced apart opposite outer portions being integrally attached at their outer ends to the respective wall section, the portions extending in alignment with one another and in generally diagonal relation to the direction of the central longitudinal axis of the one cell; and (b) a middle portion disposed between and integrally connected at its outer ends with respective inner ends of the outer portions, the middle portion extending in generally transverse relation to the direction of the central longitudinal axis of the one cell. Preferably, the outer portions are disposed approximately forty-five degrees and the middle portion approximately ninety degrees with respect to the direction of the longitudinal axis of the one cell.

Thus, the middle portion of the spring structure is adapted to contact the fuel rod in generally transverse relation thereto when the fuel rod is received through the one cell. Further, spaced lateral edges of the middle portion extend in generally transverse to the fuel rod when the fuel rod is received through the one cell.

More particularly, the opposite outer portions of each spring structure extend in inclined fashion relative to the wall section and toward one another into the one cell. The middle portion of each spring structure is disposed in the one cell and spaced from and extending generally parallel to the wall section.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 12 is a fragmentary portion of the side elevational view in FIG. 11 of the inner strap in the one set thereof.

FIG. 12A is a view similar to that of FIG. 12, but showing an unmodified diagonal spring structure comprising the invention disclosed and claimed in the last patent application cross-referenced above.

FIG. 13 is an end elevational view as seen along line 13—13 of FIG. 12, showing one set of the dimples and the spring structure on the inner strap.

FIG. 14 is a sectional view taken along line 14—14 of FIG. 12, showing the same set of dimples and spring structure of the inner strap as seen in FIG. 13.

FIG. 15 is an enlarged sectional view taken along line 15—15 of FIG. 12, showing the curvature of the modified diagonal spring structure on the inner strap.

FIG. 16 is an enlarged sectional view taken along line 16—16 of FIG. 12, showing the curvature of one of the dimples on the inner strap.

FIG. 17 is another enlarged sectional view taken along line 17—17 of FIG. 12, showing the curvature of the modified diagonal spring structure on the inner strap.

DETAILED DESCRIPTION OF THE INVENTION

Figure 1:
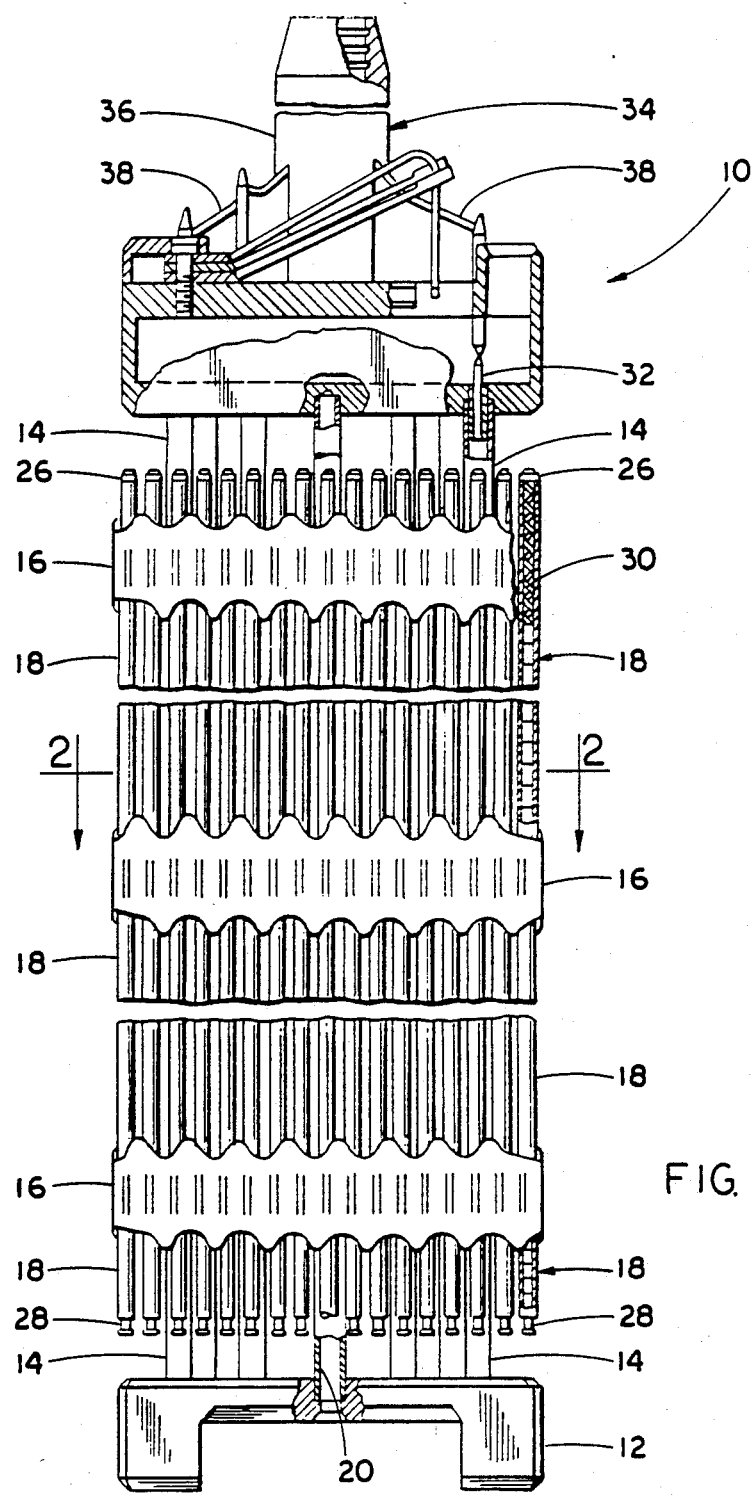
FIG. 1 is an elevational view, partly in section, of a fuel assembly which employs a fuel rod grid having the modified diagonal spring structure of the present invention, the assembly being illustrated in vertically foreshortened form with parts broken away for clarity.
Figure 2:
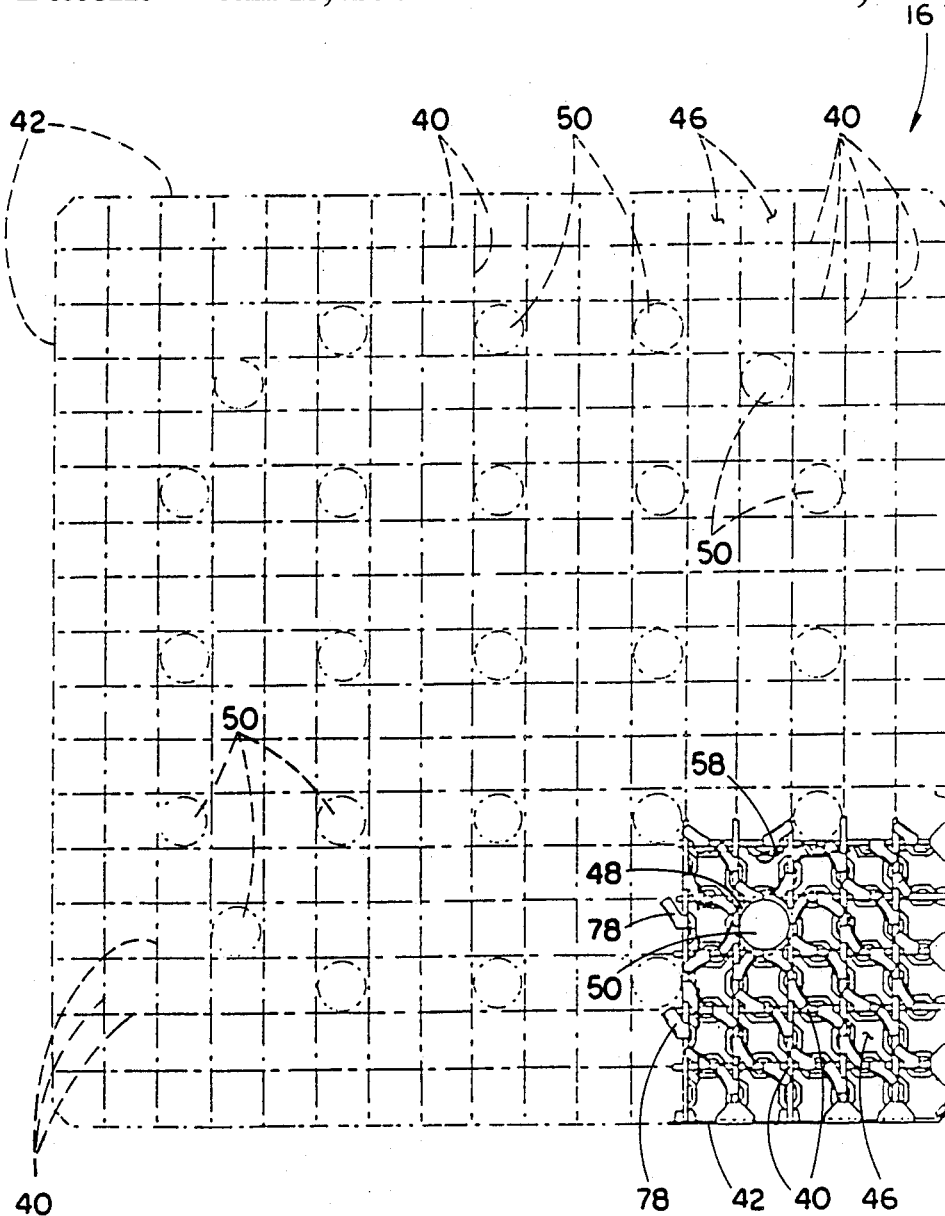
FIG. 2 is an enlarged top plan view, as seen along line 2—2 of FIG. 1, of the fuel rod grid having the modified diagonal fuel rod engaging spring structures of the present invention, showing the grid removed from the fuel assembly.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 constructed in accordance with the principles of the present invention, as will be described in detail below. The grids 16 are axially spaced along and supported by the guide thimbles 14. The assembly 10 also includes a plurality of elongated fuel rods 18 transversely spaced and supported in an organized array by the grids 16. Also, the assembly 10 has an instrumentation tube 20 located in the center thereof and an upper end structure or top nozzle 22 attached to the upper ends of the guide thimbles 14. With such arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 has associated therewith a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Grids With Modified Diagonal Spring Structures

Referring now to FIGS. 2 to 11, there is shown the preferred embodiment of the transverse fuel rod grid 16 constructed in accordance with the principles of the present invention. Basically, the grid 16 includes a plurality of inner and outer straps 40,42 having slots 44 by which the straps are interleaved with one another in an egg-crate configuration to form a matrix of hollow cells 46 and a plurality of openings 48. Due to the features of the present invention incorporated by the grid 16, the straps no longer need to be welded together at their intersections. The hollow cells 46 of the grid 16 receive therethrough respective ones of the fuel rods 18, whereas the openings 48 of the grid 16 have sleeves 50 inserted therein and attached to the inner straps 40 by which the grid 16 is disposed along and attached to the guide thimbles 14.

Figure 3:
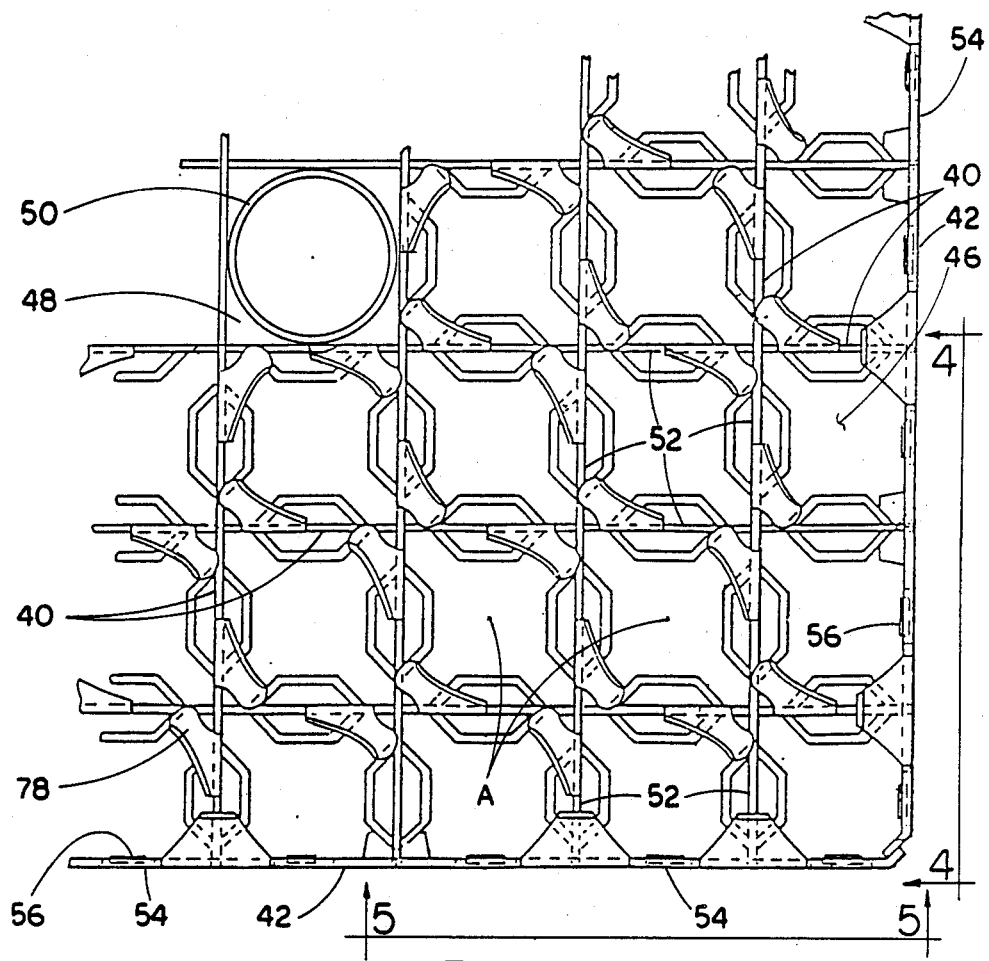
FIG. 3 is an enlarged fragmentary top plan view of the lower right corner of the grid of FIG. 2.
Figure 4:
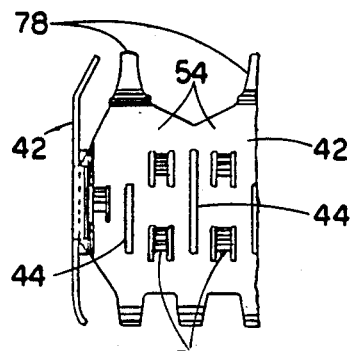
FIGS. 4 and 5 are elevational views of end portions of the outer straps which meet to form the corner of the grid as seen along respective lines 4—4 and 5—5 of FIG. 3.
Figure 5:
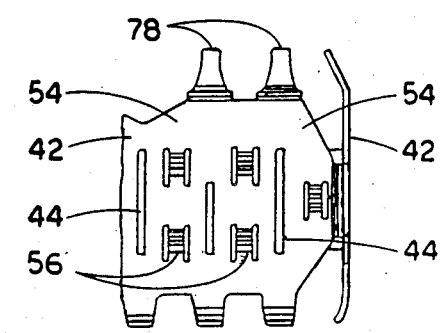
Figure 7:
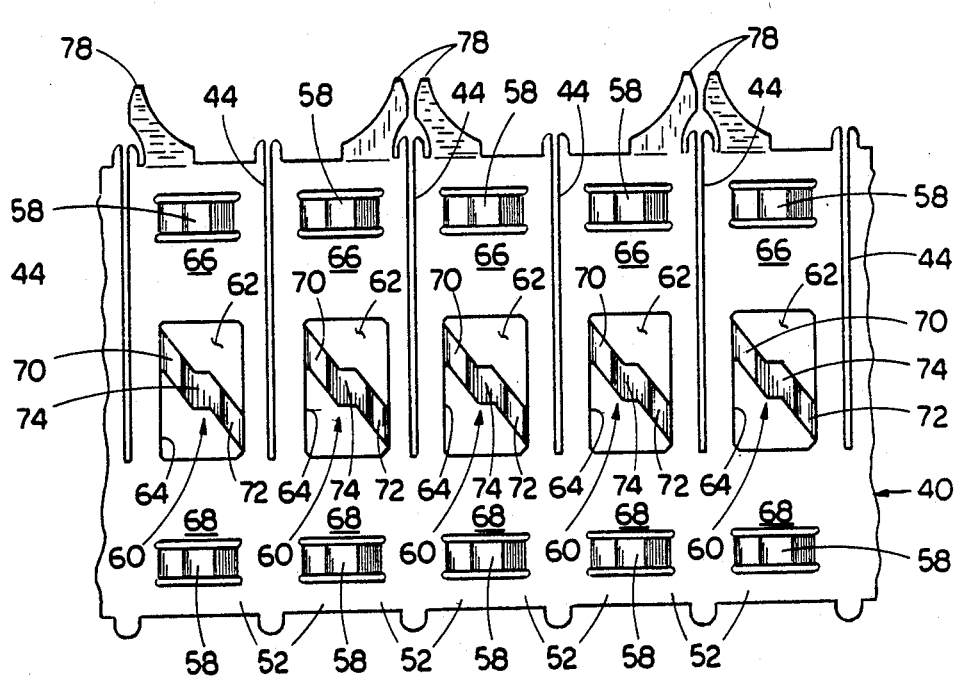
FIG. 7 is a side elevational view as seen along line 7—7 of FIG. 6 from one side of the inner strap in the one set thereof.
Figure 6:
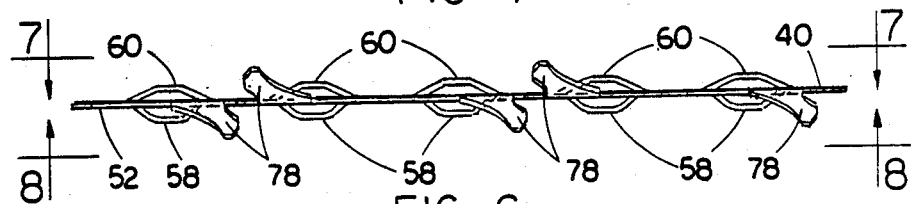
FIG. 6 is an enlarged fragmentary top plan view of the inner strap of one set thereof in the grid of FIG. 2 which interfits with the inner strap of the other set thereof shown in FIG. 9.
Figure 8:
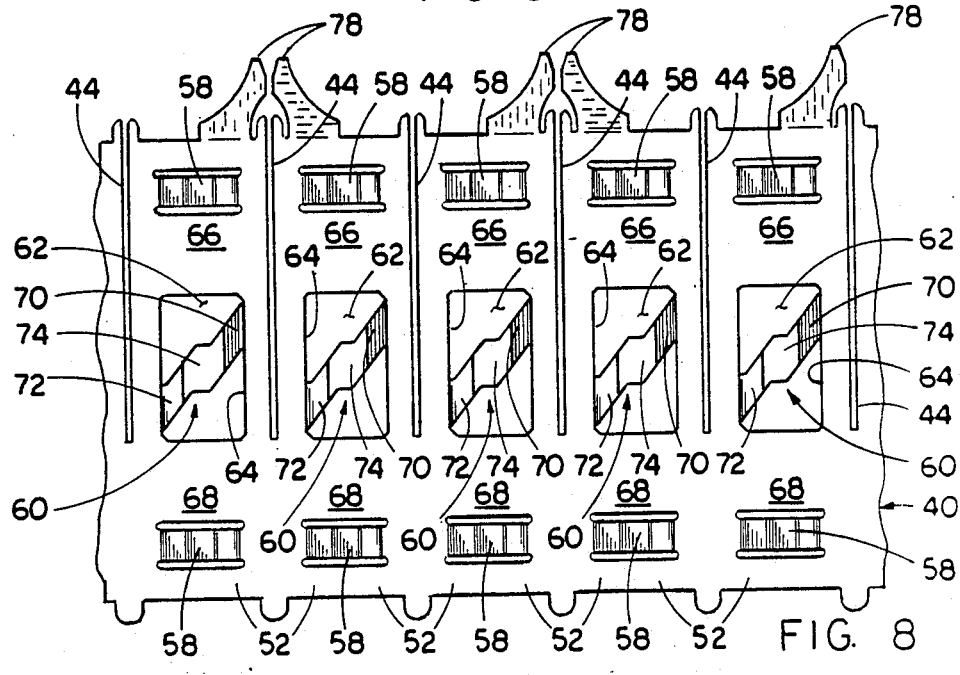
FIG. 8 is another side elevational view as seen along line 8—8 of FIG. 6 from an opposite side of the inner strap in the one set thereof.
Figure 10:
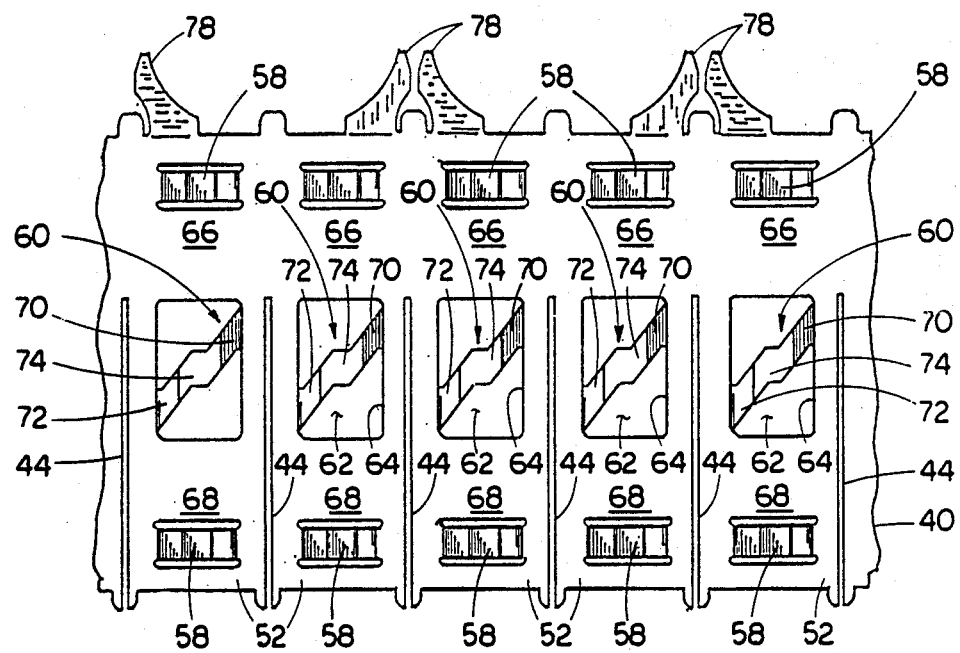
FIG. 10 is a side elevational view as seen along line 10—10 of FIG. 9 from one side of the inner strap in the other set thereof.
Figure 9:
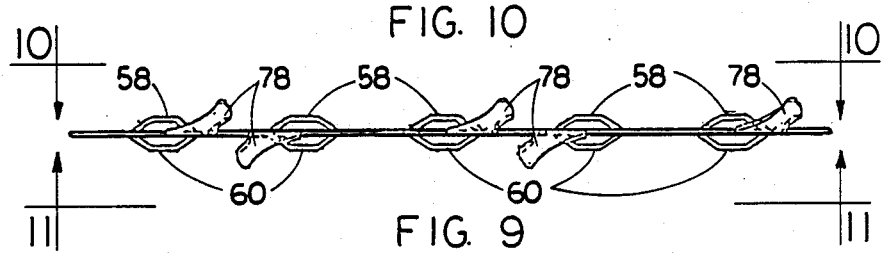
FIG. 9 is an enlarged fragmentary top plan view of the inner strap of the other set thereof in the grid of FIG. 2 which interfits with the inner strap of the one set thereof shown in FIG. 6.
Figure 11:
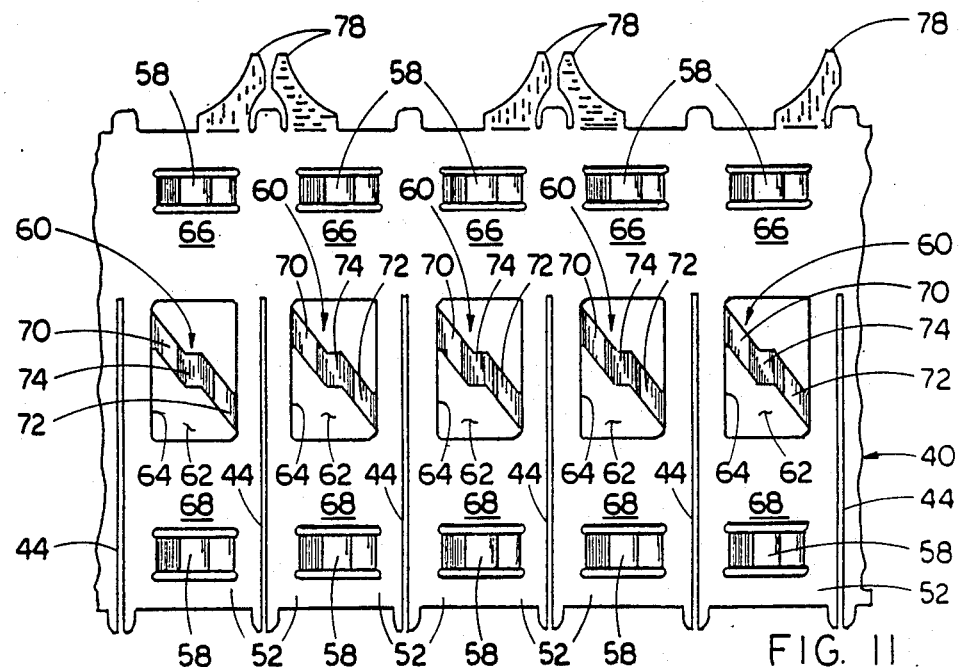
FIG. 11 is another side elevational view as seen along line 11—11 of FIG. 9 from an opposite side of the inner strap in the other set thereof.

Each cell 46 receiving one fuel rod 18 has a central longitudinal axis A therethrough defined generally parallel to pairs of opposing wall sections. The wall sections 52 compose the inner straps 40, whereas the wall sections 54 compose the outer straps 42. The inner strap wall sections 52 are shared with adjacent cells. As shown in FIGS. 3-5, the wall sections 54 of the outer straps 42 each has a pair of horizontally extending and vertically spaced fuel rod engaging dimples 56 integrally formed thereon in association with each cell 46. Similarly, the wall sections 52 of the inner straps 40 also each has a pair of horizontally extending and vertically spaced fuel rod engaging dimples 58 integrally formed thereon in association with each cell 46. One of the dimples 58 on each wall section 52 of the inner straps 40 is located above a modified diagonal spring structure 60 of the present invention, whereas the other dimple 58 is located below it. Each cell 46 formed along the periphery of the grid 16 by the inner and outer straps 40,42 has associated with it four dimples 56,58 and two spring structures 60, whereas each cell 46 formed in the grid 16 by inner straps 40 only has associated with it four dimples 56 and two spring structures 60. Thus, each fuel rod in each cell 46 is contacted at six circumferentially and axially displaced locations thereon.

More particularly, as seen in FIGS. 6-19, each fuel rod engaging modified diagonal spring structure 60, in accordance with the principles of the present invention, is composed of resiliently yieldable flexible material of the inner straps 40, such as stainless steel metal. The components of the spring structure 60, which will be described next, are integrally formed, such as by a conventional stamping operation, from and on each wall section 52 of the inner straps 40 in association with each cell 46 of the grid 16. Thus, each inner grid strap wall section 52 has a window-like opening 62 therein which is defined by removal of portions of the wall section to form the spring structure 60. In a general overall sense, the spring structure 60 is formed to extend diagonally across the opening 62 of the respective wall section 52 and integrally connect with vertical edges 64 thereof at diagonally opposite upper and lower locations on upper and lower portions 66,68 of the walls sections 52.

Basically, each modified diagonal spring structure 60 is integrally composed of a pair of upper and lower opposite outer portions 70,72 and a middle inner portion 74 therebetween. The spaced apart upper and lower outer portions 70,72 of each spring structure 60 are integrally attached at their respective outer ends 70A,72A to the respective upper and lower wall section portions 66,68. The upper and lower outer portions 70,72 extend in alignment with one another and in generally diagonal relation, preferably at forty-five degrees, to the direction of the central longitudinal axis A of the respective one grid cell 46 between the upper and lower wall section portions 66,68. The middle inner portion 74 of each spring structure 60 is disposed between and integrally connected at its opposite outer ends 74A with respective inner ends 70B,72B of the upper and lower outer portions 70,72. The middle inner portion 74 extends in generally transverse relation, preferably perpendicular or at ninety degrees, to the direction of the central longitudinal axis A of the respective one cell 46. The upper and lower outer portions 70,72 of each spring structure 60 have respective pairs of spaced lateral edges 70C,72C which extend in diagonal relation to the cell axis A; however, the lateral edges 70C of one pair thereof are offset from the corresponding lateral edges 72C of the other pair thereof in the direction of the cell axis A. The middle portion of each spring structure 60 has a pair of spaced lateral edges 74B which extend in generally transverse or substantially perpendicular relation to the cell axis A and interconnect the offset pairs of edges 70C,72C of the upper and lower outer portions 70,72.

Figure 19:
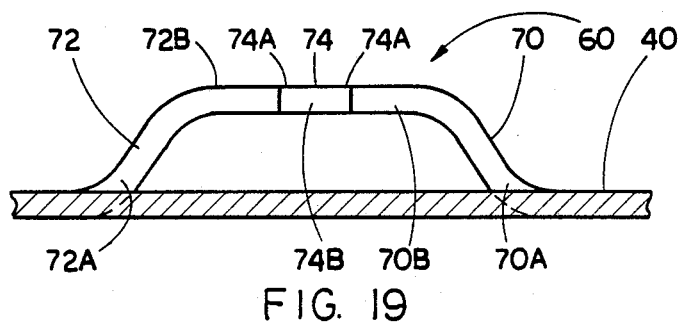
FIG. 19 is a sectional view taken along line 19—19 of FIG. 18, showing the curvature of the modified diagonal spring structure on the inner strap.

More particularly, as is readily apparent in FIGS. 17 and 19, the upper and lower outer portions 70,72 of each spring structure 60 extend in inclined fashion away from their outer ends 70A,72A and relative to the respective wall section 52 and toward one another into the one cell 46. On the other hand, the upper and lower outer portions 70,72 of each spring structure 60 at their inner ends 70B,72B and the middle inner portion 74 of each spring structure 60 are disposed in the same plane spaced inwardly into the cell 46 from and extending generally parallel to the wall section 52. The middle portion 74 is generally positioned to contact the one fuel rod 18 in generally transverse or substantially perpendicular relation thereto when the fuel rod is received through the one cell 46. More specifically, it will be recalled that the middle portion 74 has spaced lateral edges 74B which extend in generally transverse or substantially perpendicular relation to the fuel rod 18 when the latter is received through the one cell 46. In such configuration, the spring structure 60 is capable of resiliently deflecting or yielding in a direction generally orthogonal to and away from the longitudinal axis A of the associated cell 46 and toward the wall section 52 upon engagement by a fuel rod 18 when inserted in the cell 46. An open space is defined between the inwardly-projecting spring structure 60 and wall section 52 which permits unimpeded flow of coolant fluid therethrough and along the fuel rod 18 received in the cell 46.

As mentioned above, the modified diagonal spring structure 60 overall is set approximately forty-five degrees to the direction of the longitudinal axis A of the grid cell 46 and fuel assembly 10 in which the grid 16 is used. Yet the spring structure 60 is open with respect to the direction of coolant flow. Forty-five degrees appears to be the optimum angle so that grid height can be reduced and spring profile exposed to coolant flow can be minimized.

Referring to the diagonal spring structure 60A of the last patent application cross-referenced above and illustrated in FIG. 12A, underlying the present invention is discovery that with the use of diagonal spring structures the overall strength of the grid is increased. Thus, welds at the intersections between the straps 40A are no longer necessary. This results in a considerable cost savings in the manufacture of the grid. Also, with elimination of the welds, the weld openings or cavities 76 in the grid straps 40A adjacent the spring structures 60A, which were necessary heretofore to form the welds, can likewise be eliminated. However, with elimination of the weld cavities 76, less material is removed from the grid walls sections 52A adjacent to the spring structures 60A to form the slots 44A by which the straps 40A intermesh. The presence of more material undesirably increases the stiffness of the diagonal spring structure 60A.

Figure 18:
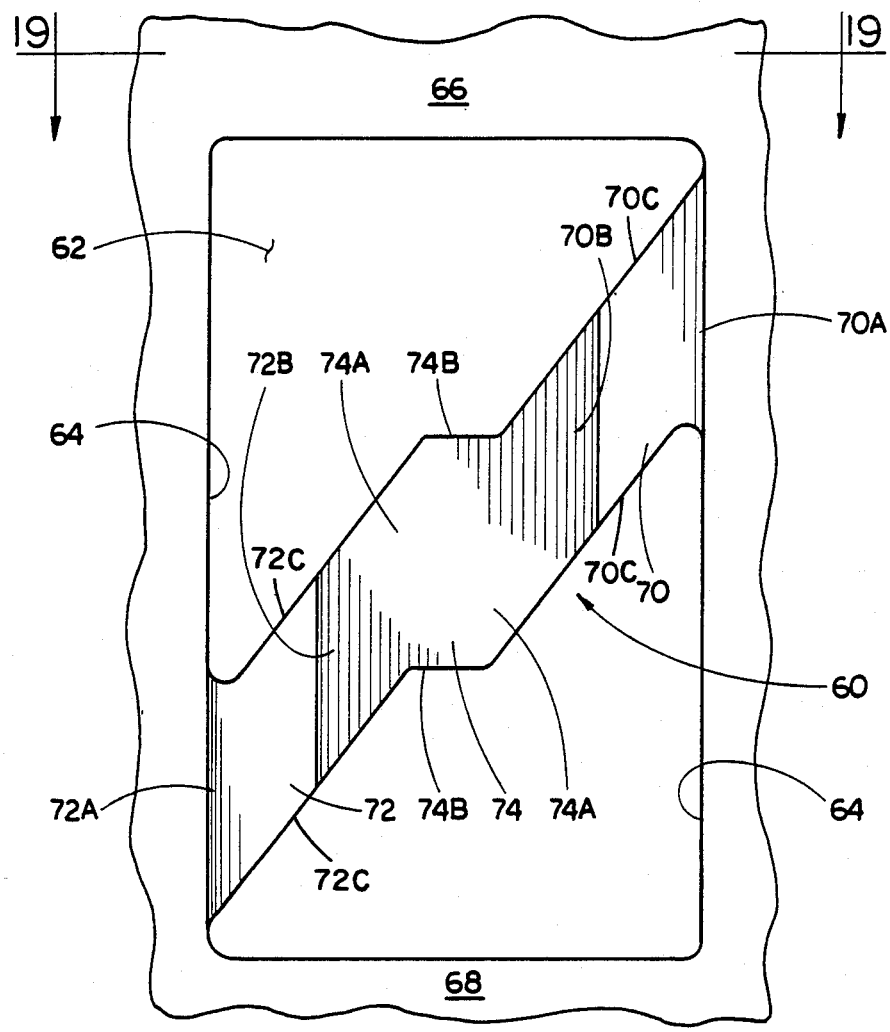
FIG. 18 is an enlarged fragmentary portion of the front view of the inner strap in FIG. 12, the fragmentary portion including only the modified diagonal spring structure.

Further, it has been discovered that by forming the spring structure 60 in a modified diagonal shape seen in FIGS. 12 and 18 the stiffness of the spring structure can be reduced. In the modified diagonal shape of the spring structure 60, its middle inner portion 74 which contacts the fuel rod 18 is formed to extend generally horizontally as opposed to diagonally and thus has edges 74B which extend substantially transverse or perpendicular to the fuel rod. In addition to reducing spring stiffness, the horizontally-extending middle inner portion 74 has been found to decrease scratching of the fuel rod which occurs when the fuel rod is pulled through the grid cell if the total spring structure extends completely diagonal with respect to the fuel rod.

In summary, the configuration of the modified diagonal spring structure 60 allows a very low profile, a reduced grid height, and a low spring constant. The spring structure 60 overall is set forty-five degrees to the direction of coolant fluid flow, but in manufacture is stamped out parallel to the direction of flow. While not forming part of the present invention, the grid 16 can have mixing vanes 78 formed along the top edge of the inner and outer straps 40,42 thereof.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a nuclear fuel rod grid including a plurality of inner and outer straps being interleaved with one another to form a matrix of hollow cells, each cell for receiving one fuel rod and being defined by pairs of opposing wall sections of said straps which wall sections are shared with adjacent cells, each cell having a central longitudinal axis, a fuel rod engaging spring structure of resiliently yieldable material being integrally formed on each wall section of said inner straps, said spring structure comprising:

(a) a pair of spaced apart opposite outer portions being integrally attached at their outer ends to said respective wall section, said portions extending in alignment with one another and in generally diagonal relation to the direction of said central longitudinal axis of said one cell; and (b) a middle portion disposed between and integrally connected at its outer ends with respective inner ends of said outer portions, said middle portion extending in generally transverse relation to the direction of said central longitudinal axis of said one cell;

(c) said upper and lower outer portions having respective pairs of spaced lateral edges which extend in diagonal relation to said cell axis and are offset from one another in the direction of said cell axis;

(d) said middle portion having a pair of spaced lateral edges which extend in transverse relation to said cell axis and interconnect said offset pairs of edges of said upper and lower outer portions.

2. The spring structure as recited in claim 1, wherein said outer portions are disposed approximately forty-five degrees with respect to the direction of said longitudinal axis of said one cell.

3. The spring structure as recited in claim 1, wherein said middle portion is disposed approximately ninety degrees with respect to the direction of said longitudinal axis of said one cell.

4. The spring structure as recited in claim 1, wherein said middle portion is adapted to contact said fuel rod in generally transverse relation thereto when said fuel rod is received through said one cell.

5. The spring structure as recited in claim 1, wherein said spaced lateral edges of said middle portion extend in generally transverse relation to said fuel rod when said fuel rod is received through said one cell.

6. The spring structure as recited in claim 1, wherein said middle portion is adapted to contact said fuel rod in a generally perpendicular relation thereto when said fuel rod is received through said one cell.

7. The spring structure as recited in claim 1, wherein:
said opposite outer portions from said outer ends thereof extend in inclined fashion relative to said wall section and toward one another into said one cell; and
said outer portions at said inner ends thereof and said middle portion are disposed in the same plane in said one cell spaced from and extending generally parallel to said wall section.

8. The spring structure as recited in claim 7, wherein said opposite outer portions by extending in inclined fashion relative to said wall section and said middle portion in being disposed in said one cell in spaced relation from said wall section together define a space between said spring structure and said wall section which permits unimpeded flow of coolant fluid therethrough and along a fuel rod received in said one cell.

9. In a nuclear fuel rod grid including a plurality of inner and outer straps being interleaved with one another to form a matrix of hollow cells, each cell for receiving one fuel rod and being defined by pairs of opposing wall sections of said straps which wall sections are shared with adjacent cells, each cell having a central longitudinal axis, a fuel rod engaging spring structure of resiliently yieldable material being integrally formed on each wall section of said inner straps, said spring structure comprising:
(a) a pair of spaced apart upper and lower opposite outer portions being integrally attached at their outer ends to said respective wall section, said upper and lower outer portions extending in alignment with one another and in generally diagonal relation to the direction of said central longitudinal axis of said one cell between upper and lower portions of said wall section; and
(b) a middle portion disposed between and integrally connected at its outer ends with respective inner ends of said upper and lower outer portions, said middle portion extending in generally transverse relation to the direction of said central longitudinal axis of said one cell;
(c) said opposite outer portions from said outer ends thereof extending in inclined fashion relative to said wall section and toward one another into said one cell;
(d) said opposite outer portions at said inner ends thereof and said middle portion being disposed in the same plane spaced from and extending generally parallel to said wall section;
(e) said upper and lower outer portions having respective pairs of spaced lateral edges which extend in diagonal relation to said cell axis and are offset from one another in the direction of said cell axis;
(f) said middle portion having a pair of spaced lateral edges which extend in transverse relation to said cell axis and interconnect said offset pairs of edges of said upper and lower outer portions.

10. The spring structure as recited in claim 9, wherein said upper and lower outer portions are disposed approximately forty-five degrees with respect to the direction of said longitudinal axis of said one cell.

11. The spring structure as recited in claim 9, wherein said middle portion is disposed approximately ninety degrees with respect to the direction of said longitudinal axis of said one cell.

12. The spring structure as recited in claim 9, wherein said middle portion is adapted to contact said fuel rod in generally transverse relation thereto when said fuel rod is received through said one cell.

13. The spring structure as recited in claim 9, wherein said spaced lateral edges of said middle portion extend in generally transverse relation to said fuel rod when said fuel rod is received through said one cell.

14. The spring structure as recited in claim 9, wherein said middle portion is adapted to contact said fuel rod in a generally perpendicular relation thereto when said fuel rod is received through said one cell.

15. The spring structure as recited in claim 9, wherein said opposite outer portions by extending in inclined fashion relative to said wall section and said middle portion in being disposed in said one cell in spaced relation from said wall section together define a space between said spring structure and said wall section which permits unimpeded flow of coolant fluid therethrough and along a fuel rod received in said one cell.

* * * * *